Figure 1:
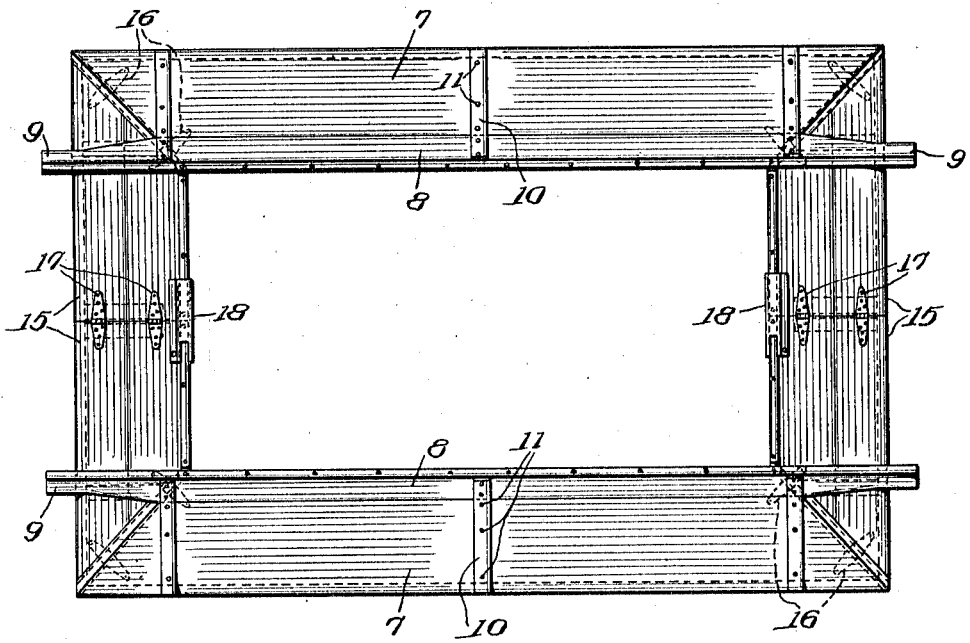

J. H. CLEARWATER.
MEASURING FORM.
APPLICATION FILED JULY 26, 1912.

1,099,165.

Patented June 9, 1914.
2 SHEETS—SHEET 1.

WITNESSES
F. J. Hartman.
J. Stuart Freeman.

INVENTOR
James H. Clearwater.
BY
ATTORNEY

J. H. CLEARWATER.
MEASURING FORM.
APPLICATION FILED JULY 26, 1912.

1,099,165.

Patented June 9, 1914.
2 SHEETS—SHEET 2.

WITNESSES
F. J. Hartman.
J. Stuart Freeman.

INVENTOR
James H. Clearwater.
BY
ATTORNEY

UNITED STATES PATENT OFFICE.

JAMES H. CLEARWATER, OF KINGSTON, NEW YORK, ASSIGNOR TO UNIVERSAL ROAD MACHINERY CO., A CORPORATION OF NEW YORK.

MEASURING-FORM.

1,099,165. Specification of Letters Patent. Patented June 9, 1914.

Application filed July 26, 1912. Serial No. 711,615.

*To all whom it may concern:*

Be it known that I, JAMES H. CLEARWATER, a citizen of the United States, and a resident of the city of Kingston, county of Ulster, and State of New York, have invented certain new and useful Improvements in Measuring-Forms, of which the following is a specification.

The object of this invention broadly is to provide an improved measuring form that is inflexible with relation to the quantity of material it is desired to contain, that when in use is rigidly maintained in extended position, and that can be readily collapsed or folded for more convenient transportation.

More specifically, the form of device comprising the preferred embodiment of this invention, is designed to facilitate the accurate measurement of material used in road construction. In the instance of Macadam and other highways maintained by the respective States and municipalities, it is customary, when necessary to top dress the roads, to let contracts for the placing at specified intervals along the roadside and in designated quantities, broken stone, gravel, etc., after the deposit of which inspectors endeavor to check up the deliveries. This, however, is a rather difficult matter as a rule, for the deliveries are often made upon projecting rocks, or other irregularities along the roadside, and, while apearing to be correct, may actually be short by half of the amount called for. Heretofore there has been no particular form for the piles of material, and they often spread or scatter, thus making it quite difficult for the inspectors to measure, and even more difficult in cases of doubt to prove non-delivery.

To obviate the many difficulties attending the present system, the device herewith presented is designed to make the measuring of each delivery of material both accurate and easy of accomplishment, and comprises in its preferred form the construction shown in the drawings, in which—

Figure 2:
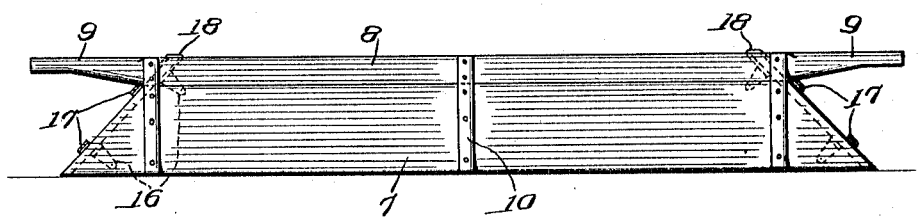
Figure 3:
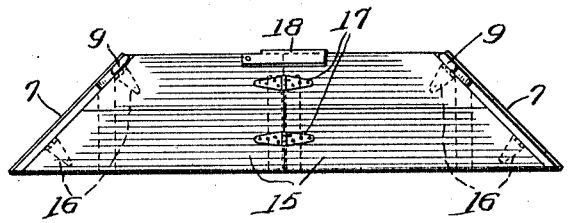
Figure 4:
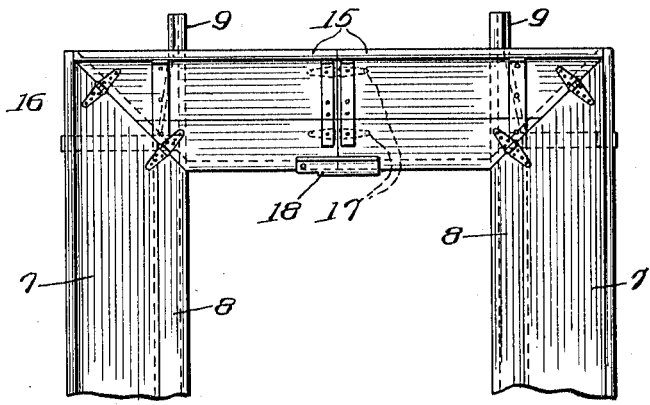
Figure 5:
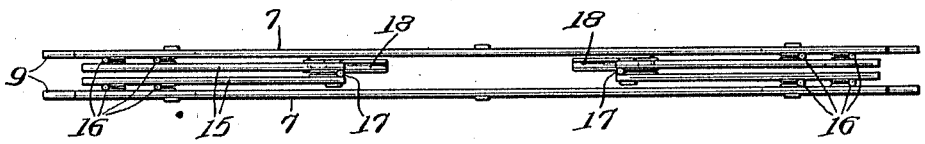

Figure 1 is a top plan view in extended position; Fig. 2 is a side elevation; Fig. 3 is an end view; Fig. 4 is a bottom plan view of one end portion of the device in extended position; and Fig. 5 is a bottom plan view of the device in folded position.

Referring to the drawings, it will be seen that the device comprises primarily a quadrilateral frusto-pyramidal frame, bounded by rigid side and folding end sections, tapering upwardly at any desired angle but preferably at an angle of substantially 45 degrees. The side sections 7 beveled and tapered on each end are rigid, as stated, and provided in each of their upper portions and as a unitary part thereof with a strip or rod 8, projecting beyond the ends of the respective adjacent section and terminating at their opposite ends in handles 9. For stiffening the side sections 7 there are positioned at spaced intervals pairs of plates 10, comprising similar members placed so as to face each other on the opposite sides of said sections, while bolts or rivets 11 are passed through said plates and their respectively adjacent interposed section, to secure said plates together and to said section.

The ends of the form are composed of similar half-sections 15, beveled and tapered on their outer ends and secured to the similarly beveled and tapered end portions of the side sections 7 by hinges 16 situated in the interior angle formed by said side and end sections. The half-sections 15 are cut square at their inner adjacent ends and secured together by hinges 17 on the outer sides thereof. For maintaining said end sections in alinement, and the device as a whole in rigid extended position, there is pivoted on or adjacent to the upper edge of one of each of the pairs of said end sections a pocket-book fastener 18, the sides of which, when in operative position, straddle the sides of the adjacent portions of the upper edges of said end half-sections.

From the foregoing description it is evident that this device may be carried in collapsed condition upon a load of material, and when desired taken down, placed in a position upon a flat surface at the roadside, opened outwardly until the ends are fully extended, in which position they are secured by the fasteners 18. The material is then filled in the form and leveled off, after which the form is lifted upwardly, leaving a solid frusto-pyramid of the material and from the fact that the sides thereof are inclined at substantially 45 degrees, the pile will maintain its shape and there will be no sliding of the sides. Then, the device being in extended position, the same may be folded for transportation by raising each of the fasteners 18 out of engagement with the sides of the half sections 15, and folding said sections inwardly upon the hinges 16 and 17, thus causing the sides to approach and take up a parallel relation with each other until the respective side and end sections are closely adjacent and parallel to one another. However, while one embodiment of the device has been shown and described, it is not desired to limit the invention to that particular form, but it is desired to anticipate any other construction which shall fall within the scope of the appended claims.

Having thus described my invention, what I claim and desire to protect by Letters Patent of the United States is:

1. A collapsible measuring form comprising a quadrangular frusto-pyramidal collapsible frame, having an unobstructed open base or under side, and an unobstructed open upper side, and including two oppositely disposed substantially flat rigid side walls, means hingedly connecting the opposite ends of each of said end walls to the opposite ends of said side walls respectively, and four handles connected to the ends of said side walls respectively and projecting outwardly therefrom at points spaced above the lower or basal edges of said side walls, each of said end walls being formed of two flat rigid sections which are hingedly connected to permit each of said end walls to fold inwardly, and the lower or longer edges of said side walls and said end walls being arranged to lie in the same plane and to rest against any suitable flat surface of unlimited area when said frame is in operation.

2. A measuring form comprising a collapsible quadro-lateral frusto-pyramidal frame having an unobstructed open base or lower side, and an unobstructed open upper side, and including two substantially flat rigid side walls, two end walls, hinges arranged within said frame in the angles between said side walls and said end walls, and connecting each end of said side walls with each end of said end walls respectively, each of said hinges being secured to an inner side of one of said side walls and to an inner side of one of said end walls, and each of said end walls being formed of two substantially flat rigid sections which are hingedly connected to permit said end walls to fold inwardly, said side walls and said end walls being arranged when in operation to converge upwardly at approximately equal angles with respect to the plane of the basal edges of said frame, and each of said side walls being provided at each end with a handle rigid therewith and projecting outwardly therefrom substantially in a plane therewith and in alinement with the upper edge thereof, and horizontally beyond the lower longitudinal, or basal, edge of the corresponding end wall, and the lower or longer edges of said side walls and said end walls being arranged to lie in the same plane and to rest against any suitable flat surface of unlimited area when said frame is in operation.

3. A measuring form comprising a collapsible quadro-lateral frusto-pyramidal frame having an unobstructed open base or lower side, and an unobstructed open upper side, and including two substantially flat rigid side walls, two end walls, hinges arranged within said frame in the angles between said side walls and said end walls, and connecting each end of said side walls with each end of said end walls respectively, each of said hinges being secured to an inner side of one of said side walls and to an inner side of one of said end walls, and each of said end walls being formed of two substantially flat rigid sections which are hingedly connected to permit said end walls to fold inwardly, and each of said end walls being provided with means carried by one of its said sections and arranged to coöperate with the other of its said sections to hold said sections in alinement, said side walls and said end walls being arranged when in operation to converge upwardly at angles of approximately 45° with respect to the plane of the basal edges of said frame, and each of said side walls being provided at each end with a handle rigid therewith and projecting outwardly therefrom substantially in a plane therewith and in alinement with the upper edge thereof, and horizontally beyond the lower longitudinal, or basal, edge of the corresponding end wall, and the lower or longer edges of said side walls and said end walls being arranged to lie in the same plane and to rest against any suitable flat surface of unlimited area when said frame is in operation.

4. A measuring form comprising a collapsible quadro-lateral frusto-pyramidal frame including two substantially flat rigid side walls, two end walls, hinges connecting each end of each side wall with the corresponding end of each end wall respectively, each of said end walls being formed of two substantially flat rigid sections which are hingedly connected to permit said end walls to fold inwardly, and each of said side walls being provided along its upper longitudinal edge with a relatively narrow strip rigidly secured thereto and projecting substantially in a plane therewith and in opposite directions therefrom and horizontally beyond the lower or basal edges of said end walls to form oppositely arranged handles.

In witness whereof I have hereunto set my hand this 24th day of July, A. D. 1912.

JAMES H. CLEARWATER.

Witnesses:
WILLIAM H. FULLER,
ROBERT E. LEIGHTON.

Copies of this patent may be obtained for five cents each, by addressing the "Commissioner of Patents, Washington, D. C."